017;# United States Patent [19]

Hackett

[11] 4,314,587
[45] Feb. 9, 1982

[54] RIB DESIGN FOR BOILER TUBES

[75] Inventor: Charles D. Hackett, Tunnel Hill, Ga.

[73] Assignee: Combustion Engineering, Inc., Windsor, Conn.

[21] Appl. No.: 73,967

[22] Filed: Sep. 10, 1979

[51] Int. Cl.³ ............................................. F16L 11/14
[52] U.S. Cl. ...................................... 138/38; 165/177; 165/184
[58] Field of Search ................................... 138/38–44, 138/37; 165/179, 184, 183, 110, 177; 62/285

[56] References Cited

U.S. PATENT DOCUMENTS

| | | | |
|---|---|---|---|
| 1,720,244 | 7/1929 | Smith | 138/37 |
| 1,877,567 | 9/1932 | Erbes | 138/37 |
| 2,687,747 | 8/1954 | Bock | 138/38 |
| 3,269,420 | 8/1966 | Woodling | 138/38 |
| 3,875,997 | 4/1975 | Newson et al. | 138/38 |
| 4,059,129 | 11/1977 | Feis | 138/40 |

FOREIGN PATENT DOCUMENTS 6845 of 1900 United Kingdom ................... 138/38

*Primary Examiner*—Houston S. Bell, Jr.
*Attorney, Agent, or Firm*—Arthur E. Fournier, Jr.

[57] ABSTRACT

A tubular member of the type, primarily intended for utilization in a boiler, and having rifling, i.e., ribbing, provided on the internal surfaces thereof that is operable for purposes of effecting the disruption of the internal flow of the fluid passing therethrough. The ribbing with which the subject tubular member is provided embodies a configuration that is preselected so that the ribbing is operative to enable accurate and precise control to be exercised through the use thereof over the movement of the fluid flowing through the tubular member. Consideration is given to the following factors, among others, in establishing the design criteria that, in turn, determines the configuration that the ribbing embodies in a given tubular member; namely, the type of fluid; the fluid pressure; the fluid flow rate; the internal dimensions of the tubular member; the temperature gradient within the tubular member wall, both circumferentially and longitudinally, etc. The aforementioned design criteria includes parameters selected from variations possible in the angle which the ribbing bears to the lateral axis of the tubular member; variations possible in the spacing between individual ribs of the ribbing; whether the ribbing is continuous or noncontinuous; whether the ribbing is provided on only one side wall of the tubular member or on more than one side wall thereof; and the particular dimensions of the rib design in terms of the specific height, the specific width, the specific radii and the specific angles that each individual rib embodies.

9 Claims, 13 Drawing Figures

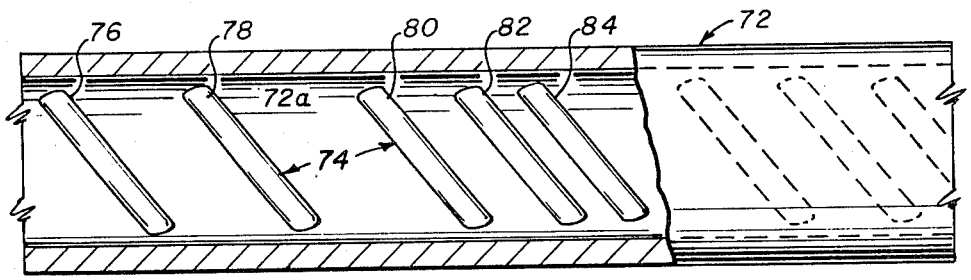
FIG. 5
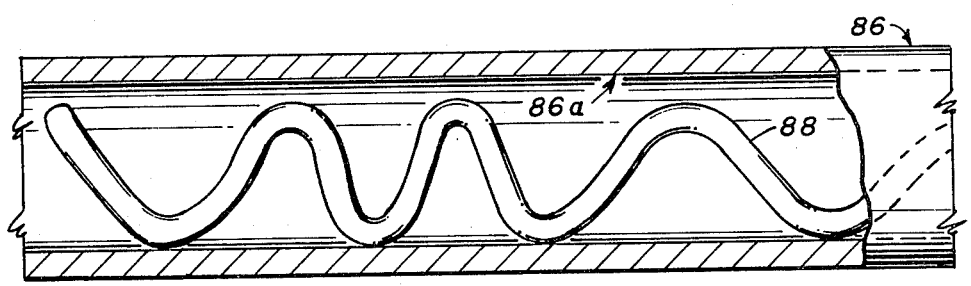
FIG. 6
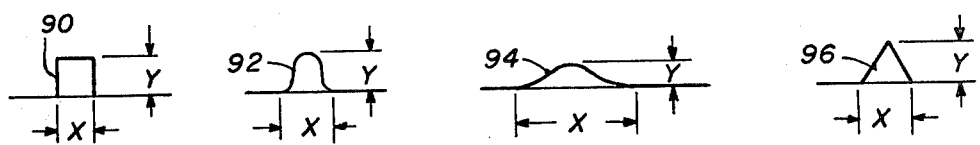
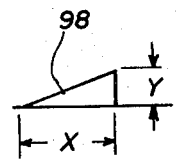
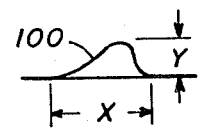
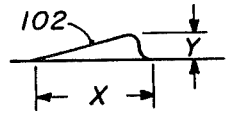
FIGS. 7A – 7G

RIB DESIGN FOR BOILER TUBES

CROSS REFERENCE TO RELATED APPLICATIONS

This application is hereby cross referenced to the following two patent applications which were commonly filed herewith and which are commonly assigned: U.S. patent application Ser. No. 073,968 filed Sept. 10, 1979 entitled, "Method of Forming Variably Rifled Tubes," filed in the names of Thomas L. Mabery, et al; and U.S. patent application Ser. No. 073,969, filed Sept. 10, 1979 entitled, "Method of Making Variably Rifled Tubes," filed in the names of Thomas L. Mabery, et al.

BACKGROUND OF THE INVENTION

This invention relates to tubular members designed to have fluid flow therethrough, and, more particularly, to tubular members of the type that are intended primarily for utilizaton in a boiler, and which embody means operable for exercising control over the movement of the fluid in the tubular member.

It is widely known that a major operating component of any conventionally constructed steam generatng system is the boiler. Likewise, it is widely known that it is in the boiler that the generation of steam is actually effected. In this regard, the aforesaid generation of steam is commonly accomplished as a consequence of the passage of water through a multiplicity of tubular members, i.e., tubes, during which passage the water is sufficiently heated so as to cause it to change state, i.e., to change from a liquid to a vapor.

Within a heat transferring or vapor, i.e., steam generating system, there exists an infinite number of conditions relating to temperature, primary and secondary fluid movements, and structural configurations that influence the performance thereof. Accordingly, it is both desirable and beneficial to have the capability to design into such systems precise and accurate control of the fluid movement therewithin so as to maximize the efficiency of the system.

The present invention is directed to a boiler tube that is provided on the inside surface thereof with physical characteristics that are required thereby in order to insure the existence of a proper fluid movement therethrough so that the heat transfer rate to the fluid medium is maximized. To this end, the tube bore surface is made uneven such as, for instance, by deforming the existing tube material, or by affixing additional material thereto as through the welding thereof, or by depositing weld metal thereon. Such modifications in or additions to the material that constitutes the tube bore surface is intended to function to provide a turbulence to the fluid thereby tending to eliminate a temperature gradient within the fluid at any cross sectional plane taken across the tubular area. In addition, this exercise of control over the fluid motion within the tube is also intended to function to prevent the formation of vapor pockets or vapor layers adjacent to the tube inner wall surface that operate to produce an adverse effect on the heat transfer properties of the medium.

More specifically, it is obviously important that boiler tube failure be avoided in steam generating systems. Moreover, insofar as concerns the matter of boiler tube failure, one known cause thereof is overheating of the tube. Furthermore, it is known that an inefficient transfer of heat through the tube wall to the water, i.e., fluid medium flowing therewithin can lead to the tube overheating. The reference here to an inefficient transfer of heat through the tube wall is meant to encompass the situation wherein the accomplishment of the desired heat transfer process is impeded by the presence of so-called nucleate boiling, i.e., wherein stagnation of steam bubbles that function in the nature of insulation impedes the passage of the heat through the tube wall to the water flowing therewithin.

By way of a summary, the condition which is sought to be avoided here in an effort to minimize the susceptibility of the tubes to become overheated as a result of nucleate boiling, is that wherein there exists within the tube a laminar flow of water or steam. As used herein, the term laminar flow is meant to refer to a stream line or viscous flow of the fluid axially of the tube. Namely, it is desired to effect the breaking up of such laminar flow in the tube.

As the water flows through the tube, the outer layer of the water, i.e., the layer of water in closest proximity to the inner wall of the tube, becomes heated by the heat being transmitted through the tube wall. As a consequence thereof, the outer layer of water changes to steam. During this process of changing to steam, the first change, which the outer layer of water undergoes, is the formation therein of steam bubbles. Mention has previously been had herein of the fact that steam bubbles act as an insulation. Consequently, unless the steam bubbles, which are being formed in the outer layer of water, are made to mix, they will, in essence, remain stationary, i.e., stagnate and take on the attributes of an insulative film, thereby causing localized hot spots to develop along the tube wall. Moreover, such hot spots, in turn, can cause overheating of the tube, and ultimately lead to tube failures. Additionally, unless they are made to mix, the steam bubbles, by virtue of their insulative capability, will also function to prevent further heating of the core of water, which is passing rapidly through the center of the tube in the form of laminar flow, the latter term being employed herein as defined above.

Thus, from the preceding, it should now be readily apparent that in order to achieve the rapid and efficient transfer of heat through the tube walls to the water flowing therewithin, there exists a need to provide some form of means that would be operative to effect the breaking up of the laminar flow of water through the tube. Namely, some such form of means is needed to effect the mixing of the outer layer of water and thereby also the steam bubbles entrained therein with the core of water flowing through the central region of the tube. As noted previously above, one such form of means, which has been employed heretofore in the prior art, to achieve a controlled internal disruption of the flow of water through a boiler tube has involved the usage of ribbing, i.e., rifling, on the internal surface of the boiler tube.

As regards the nature of the existing prior art teachings relating to the matter of providing boiler tubes with rifled inner wall surfaces, reference may be had, by way of exemplification, for purposes of obtaining a familiarity therewith to the following U.S. Pat. Nos. 3,088,494; 3,213,525; 3,272,961; 3,289,451 and 3,292,408. More specifically, U.S. Pat. No. 3,088,494, which issued to P. H. Koch, et al on May 7, 1963, is directed to providing a vapor generating tube that has its interior wall formed with helical lands and grooves, which are proportioned and arranged in a particular predetermined fashion. In accord with another such exemplary prior art teaching, U.S. Pat. No. 3,213,525, which issued to W. M. Creighton, et al on Oct. 26, 1965, is directed to a method of forming an internal rib in the bore of a tube wherein material is removed from the inner tube wall by means of a cutting operation to form the subject ribbing. A still further example of these prior art teachings can be found in U.S. Pat. No. 3,272,961, which issued to L. A. Maier, Jr., et al on Sept. 13, 1966 and wherein a method and apparatus are taught for making ribbed vapor generating tubes and in accordance with which a rib is deposited on the inside surface of a tube through the use of a welding process. U.S. Pat. No. 3,289,451, on the other hand, which issued to P. H. Koch, et al on Dec. 6, 1966, is directed to a method and apparatus for forming internal helical ribbing in a tube wherein the internal ribbing is formed by means of a cold drawing operation. Finally, U.S. Pat. No. 3,292,408, which issued to J. R. Hill on Dec. 20, 1966, is directed to a method of forming internally ribbed tubes wherein the tube is provided with an asymmetrical helical groove so as to facilitate removal of the forming tool from the tube.

Notwithstanding the existence of the afore-described prior art teachings, a need has nevertheless been shown to exist for a boiler tube that embodies a new and improved form of rib design. More specifically, the boiler tubes produced through the employment of prior art methods are known to be adversely characterized by the fact that they each suffer from certain notable disadvantages. For instance, a major disadvantage of boiler tubes produced by the methods and apparatus for effecting the formation of ribbed boiler tubes that have been known here-to-date resides in the invariableness of the rib design, which the boiler tube is made to embody. That is, there is an inherent inflexibility associated with the use of prior art methods and apparatus insofar as concerns effectuating variations in the configuration of the rib design that is to be formed in the surface of the tube inner wall.

Namely, as noted previously herein, nucleate boiling can lead to the development of localized hot spots that, in turn, cause overheating and ultimately boiler tube failures. To minimize the establishment of such localized hot spots in boiler tubes stemming from the existence of nucleate boiling, it has been proposed by the prior art to provide ribbing, i.e., rifling, on the inner wall surface of the tube. Unfortunately, however, the methods and apparatus known in the prior art heretofore for effectuating the making of such rifled tubing render it difficult to enable significant variations in pattern configuration to be implemented for purposes of compensating for variations in the location of potential hot spots along the inner walls of the tubes. That is, existing methods and apparatus are limited to the utilization of fixed patterns, such that each boiler tube, irrespective of the location it occupies in the boiler, i.e., its relative exposure to external sources of heat, is necessarily provided with the same pattern of rifling, even though from a heat transfer standpoint, it may be desirable to vary the pattern as between locations within the same tube, as well as between tubes in the same boiler.

By way of exemplification in this regard, particular attention is directed to U.S. Pat. No. 3,272,961 to which reference has previously been had hereinbefore. This patent contains a teaching of providing a boiler tube with rifling in the form of a weld deposit. The method and apparatus as taught therein, however, are disadvantageously characterized by their total lack of flexibility in effecting adjustments in the rifled pattern that is being formed in a boiler tube to compensate for providing the boiler tube with different heat transfer characteristics in various locations along the length thereof. Namely, in accord with the teachings of U.S. Pat. No. 3,272,961, the implementation of the formation of a rifled pattern in a tube is predicated upon the creation of a pattern that comprises a repeat of the same rifling configuration for the entire length of each individual boiler tube. Moreover, not only are changes in pattern of rifling as between different locations in the same tube difficult to effect with the apparatus described in the aforesaid U.S. Pat. No. 3,272,961, but also, it is difficult therewith to effect changes in pattern of rifling as between different tubes, wherein it is desired to have them embody individually different heat transfer characteristics. Principally, this is because to effect such changes requires the establishment of completely different relationships between the components, i.e., tube, welding means, etc., from those which these components bear one to another in order to effectuate the formation in a boiler tube of a given rib design. Namely, these components must have different relationships one to another for each different pattern of rifling, i.e., rib design, with which it is desired to provide a boiler tube.

In summary, in order to effect the exercise of control over the motion of the fluid flowing through a boiler tube, reliance is had to the use of a variety of forms, shapes, sizes and/or patterns that are suitably provided on the tube bore surface. More specifically, such control is effected through the employment of means, which, for purposes of the discussion herein, is characterized by being a rib, irrespective of the shape which the latter may embody, or whether it is continuous or non-continuous. Most importantly, the exact configuration which such a rib formed on the tube bore surface is made to embody is a variable that is dependent on the type of fluid medium, the fluid pressure, the fluid flow rate, the tube size, the temperature gradient within the tube wall in both a circumferential and a longitudinal direction, as well as other variables. A consideration of these factors for purposes of providing the inner tube wall with the physical characteristics that are required in order to insure a proper fluid movement therein so as to maximize the heat transfer rate to the fluid medium can lead to the utilization of a rib design wherein the parameters applicable thereto are selected from variations which are possible in the angle that the ribbing bears to the lateral axis of the tube; variations which are possible in the spacing between individual ribs of the ribbing; whether the ribbing is continuous or non-continuous; whether the ribbing is provided on only one internal side wall of the tube or on more than one internal side wall thereof; and the particular dimensions of the rib in terms of the specific heighth, the specific width, the specific radii and the specific angles that individual portions of a given rib embodies.

For example, variations in the angle that the ribs bear to the lateral axis of the tube and/or variations in the spacing between individual ribs in a given rib design offer a high degree of flexibility in compensating for the potential existence of localized hot spots. Namely, through the selection of the proper parameters from the aforesaid variables, it is possible to select a rib design wherein provision is made for the creation of the desired fluid flow properties for each increment of tube length so as to effect a realization of the proper fluid movement for maximizing the heat transfer rate along the entire length of the tube. It is to be noted that, for purposes of achieving a maximization of the heat transfer rate, it is conceivable that it could be deemed necessary to utilize a rib design wherein variations exist therein in each increment of tube length. Apart from the types of variations mentioned at the outset of this paragraph, the need to obviate the existence of localized hot spots may dictate the use of a rib design that is discontinuous, i.e., wherein the rib design is provided only in areas of the tube inner surface that are exposed to a high heat flux, and/or a rib design that is provided on only one side wall of the tube, i.e., on the side wall of the tube that corresponds to the heat source side thereof. Finally, note is taken of the fact that various rib shapes may be employed. In this regard, the rib that is utilized may be symmetrical in shape while in other instances, it may be deemed advisable to employ other rib shapes which offer directional flow features that can be advantageous in regard to pressure drop considerations. Also, the film coefficient of heat transfer can be improved through the proper selection of the shape of the rib inasmuch as the former is known to be dependent upon the direction of fluid flow relative to the heating surface. As with the spacing and the pitch of the ribs, the heighth, width, radii and angles of the various rib shapes can be controlled to fulfill predetermined design criteria. In summary, in accord with the present invention, it has been recognized that each rib shape and rib size will provide an individual flow motion and pressure drop, thereby offering an infinite range of fluid motion control for design selection to provide the desired individual flow characteristics for each incremental section of a heat transfer system.

It is, therefore, an object of the present invention to provide a new and improved form of tubular member of the type intended to have fluid flow therethrough.

It is another object of the present invention to provide such a tubular member, which embodies means operable for exercising control over the movement of the fluid in the tubular member.

It is still another object of the present invention to provide such a tubular member wherein control over the movement of the fluid therewithin is effected by providing the inner surface of the tubular member with ribbing, the latter embodying a variable configuration, the parameters of which are selected on the basis of the ability thereof to fulfill predetermined design criteria, i.e., the design criteria that will enable the tubular member to possess the fluid flow properties for each increment of length thereof required to achieve a maximization of the heat transfer rate to the fluid.

A further object of the present invention is to provide such a tubular member embodying on the inner surface thereof variable ribbing wherein one of the parameters that determines the nature of the design of the ribbing and which is a variable, is the angle which the ribs of the ribbing bear to the lateral axis of the tubular member, i.e., the pitch of the ribbing.

A still further object of the present invention is to provide such a tubular member embodying on the inner surface thereof variable ribbing wherein one of the parameters that determines the nature of the design of the ribbing and which is a variable is the spacing that exists between the individual ribs that collectively serve to comprise the ribbing.

Yet another object of the present invention is to provide such a tubular member embodying on the inner surface thereof variable ribbing wherein one of the parameters that determines the nature of the design of the ribbing and which is a variable is whether the ribbing is continuous or discontinuous.

Yet still another object of the present invention is to provide such a tubular member embodying on the inner surface thereof variable ribbing wherein one of the parameters that determines the nature of the design of the ribbing and which is a variable is whether the ribbing is provided on only one longitudinally extending side wall of the tubular member, or on more than one side wall thereof.

Yet a further object of the present invention is to provide such a tubular member embodying on the inner surface thereof variable ribbing wherein one of the parameters that determines the nature of the design of the ribbing and which is a variable is the shape of the individual ribs in terms of the heighth, width, radii and angles thereof.

SUMMARY OF THE INVENTION

In accordance with the present invention, there is provided a novel and improved form of boiler tube that embodies means operable for effecting the exercise of control over the movement of fluid therewithin for purposes of maximizing the rate of heat transfer to the fluid. The subject means, which the boiler tube embodies, comprises ribbing that is provided on the tube inner wall surface. The particular configuration of rib design, which the ribbing embodies, is selected on the basis of the capability thereof to fulfill certain predetermined design criteria that are established by the need to provide the boiler tube with the proper fluid flow properties along each increment of its length. The parameters that define the nature of the configuration of the rib design that is utilized are selected from amongst a plurality of variables. A first one of these variables is the angle which the ribs of the ribbing bear to the transverse axis of the tube, i.e., the pitch of the ribbing. A second one of these variables is the spacing that exist between the individual ribs that collectively comprise the ribbing. A third one of these variables is whether the ribbing is continuous or discontinuous. A fourth one of these variables is whether the ribbing is located on only one longitudinally extending side wall of the tube, or on more than one side wall thereof. A fifth one of these variables is the shape that the individual ribs embody in terms of the heighth, width, radii and angles thereof.

BRIEF DESCRIPTION OF THE DRAWING

FIG. 5 is a cross sectional view of a portion of a tubular member constructed in accordance with the present invention, illustrated embodying ribbing in the form of a rib design that is provided on only one longitudinally extending side wall of the tubular member and wherein all of the ribs are discontinuous but some of the ribs are of variable pitch and some of the ribs are of uniform pitch;

FIG. 6 is a cross sectional view of a portion of a tubular member constructed in accordance with the present invention, illustrated embodying ribbing in the form of a rib design that is provided on only one longitudinally extending side wall of the tubular member and wherein the ribs are continuous but some of the ribs are of variable pitch and some of the ribs are of uniform pitch; and FIGS. 7A-7G are cross sectional views of a rib of the type employable in the ribbing with which a tubular member constructed in accordance with the present invention is provided, illustrating some of the various shapes that the rib may embody.

DESCRIPTION OF A PREFERRED EMBODIMENT

Figure 1:
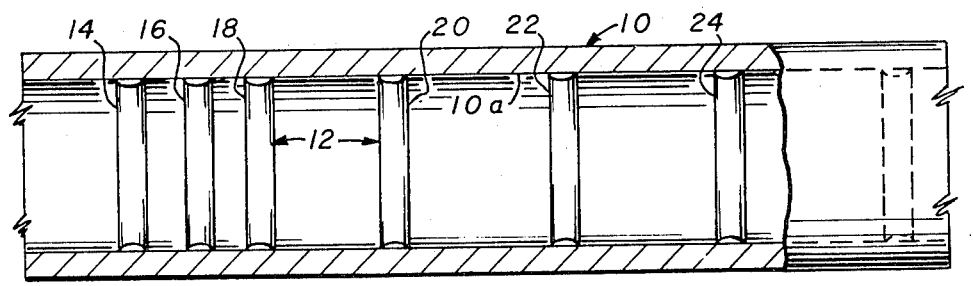
FIG. 1 is a cross sectional view of a portion of a tubular member constructed in accordance with the present invention, illustrated embodying ribbing in the form of a rib design wherein the ribs are discontinuous and variable spacing exists therebetween.

Referring now to the drawing, in each of FIGS. 1-6 thereof, there is depicted a tubular member, generally designated in FIG. 1 by the reference numeral 10, constructed in accordance with the present invention, which embodies a particular configuration of ribbing that is intended to be exemplary in nature. More specifically, the present invention is directed to the provision of a tubular member, e.g., a boiler tube, 10, which through the embodiment therein of ribbing consisting of a particular configuration of rib design is provided on the inside surface thereof with the physical characteristics needed in order to effect the proper movement of the fluid through the tube 10 and thereby as a result, achieve a maximization of the heat transfer rate to the fluid medium.

By way of iteration, specific note is taken of the fact that with regard to the matter of the particular forms of construction that have been illustrated in each of the Figures of the drawing, such constructions are intended to constitute only a representative showing of the variety of different forms, shapes, sizes, and/or patterns, which the ribbing provided on the tube inner surface may embody in accordance with the present invention. In this regard, each tube 10 is designed to be provided with ribbing, which embodies a specific form of rib design. Moreover, each particular rib in a given rib design embodies a shape and a size that has been selected with particularity so as to insure that each rib has the capability of producing a predetermined flow motion and pressure drop. In summary, it is to be understood that the present invention involves a recognition of the fact that it is possible to provide a tubular member with ribbing of variable configuration wherein the latter variable configured ribbing operates to advantageously imbue the tubular member through the use thereof with the capability of offering an infinite range of fluid motion control for design selection whereby it is possible to provide the tubular member with the proper individual flow characteristics for each incremental section thereof such that the efficiency of the heat transfer, e.g., vapor generating, system in which the tubular member is to be utilized is maximized.

The nature of the configuration of the ribbing with which the tube 10 is provided is definable through the use of a multiplicity of parameters that, in turn, are selected from amongst a plurality of factors, each of which is itself a variable. Numbered among these factors are the following: The angle which the ribs of the ribbing bear to the transverse axis of the tube, i.e., the pitch of the ribbing; the spacing that exists between the individual ribs that collectively serve to comprise the ribbing; whether the ribbing is continuous or discontinuous; whether the ribbing is positioned solely on one longitudinally extending side wall of the tube, or on more than one longitudinally extending side wall thereof; and the nature of the shape of the individual ribs in terms of the heighth, width, radii and angles thereof.

A discussion of the above list of factors will now be had with particular reference to the Figures of the drawing. To this end, in FIG. 1 there is depicted a portion of a boiler tube 10 that embodies on the inside surface 10a thereof ribbing, the latter being designated therein generally by the reference numeral 12. The ribbing 12 is characterized by the fact that the individual ribs 14, 16, 18, 20, 22 and 24 are each discontinuous, i.e., are all unconnected one to another. Moreover, the spacing between the individual ribs 14, 16, 18, 20, 22 and 24 is variable, e.g., the spacing between the individual ribs 18 and 20 is greater than the spacing between the individual ribs 14 and 16. As illustrated in FIG. 1, the spacing between the ribs 20, 22 and 24 is substantially the same, while the spacing between the ribs 14, 16 and 18 similarly is substantially the same. However, it is to be understood that other spacings could be utilized between the ribs 14, 16, 18, 20, 22 and 24 of the ribbing 12 without departing from the essence of the present invention. In summary, for purposes of this discussion, FIG. 1 is simply intended to depict a rib design, i.e., the ribbing 12 wherein the ribs 14, 16, 18, 20, 22 and 24 thereof are discontinuous and the spacing therebetween varies.

Figure 2:
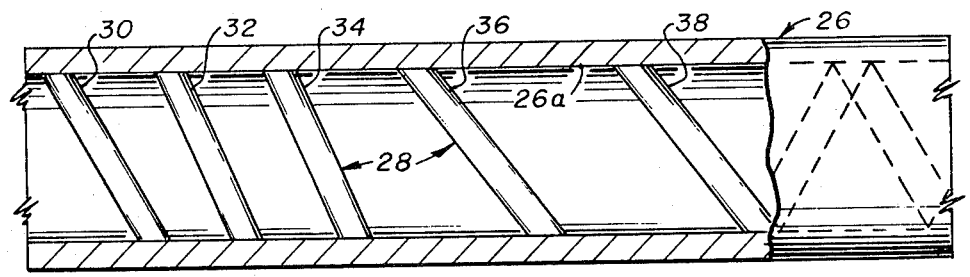
FIG. 2 is a cross sectional view of a portion of a tubular member constructed in accordance with the present invention, illustrated embodying ribbing in the form of a rib design wherein the ribs are continuous and of variable pitch.

Turning next to a consideration of FIG. 2, there is illustrated therein a portion of a boiler tube 26 embodying on the inner surface 26a thereof ribbing, generally designated by the reference numeral 28. The ribbing 28 is characterized in the fact that the individual ribs 30, 32, 34, 36 and 38 are continuous, i.e., are all interconnected one to another, and the fact that the angle which the ribs 30, 32, 34, 36 and 38 bear to the transverse axis of the tube 26 is a variable. As concerns the latter, the pitch of the ribs 32 and 34 is illustrated as being substantially the same, while the pitch of the ribs 36 and 38 is likewise depicted as being substantially the same. Summarizing, FIG. 2 is designed to depict a tube 26 wherein the ribbing 28 thereof consists of ribs 30, 32, 34, 36 and 38 which are continuous and of variable pitch.

Figure 3:
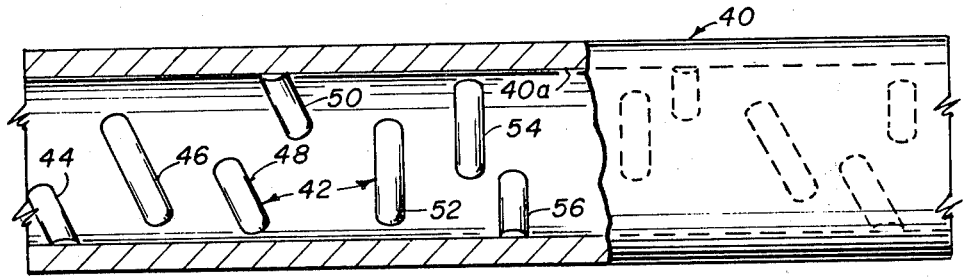
FIG. 3 is a cross sectional view of a portion of a tubular member constructed in accordance with the present invention, illustrated embodying ribbing in the form of a rib design wherein the ribs are of variable length and of variable pitch.

FIG. 3 is directed to a tube 40, which is provided on the inner surface 40a thereof, with ribbing, generally designated therein by reference numeral 42, embodying a randomly patterned rib design. More specifically, the ribbing 42 consists of a random pattern of individual ribs 44, 46, 48, 50, 52, 54 and 56. Moreover, the ribbing 42 is characterized in the fact that the ribs 44, 46, 48, 50, 52, 54 and 56 all vary in length, and in the fact that the pitch thereof also varies. The intent here is to show, through the illustration of the tube 40 in FIG. 3, that a tube 40 is capable of being provided with a ribbing 42 wherein the configuration of the latter takes the form of a rim design of randomly patterned ribs.

Figure 4:
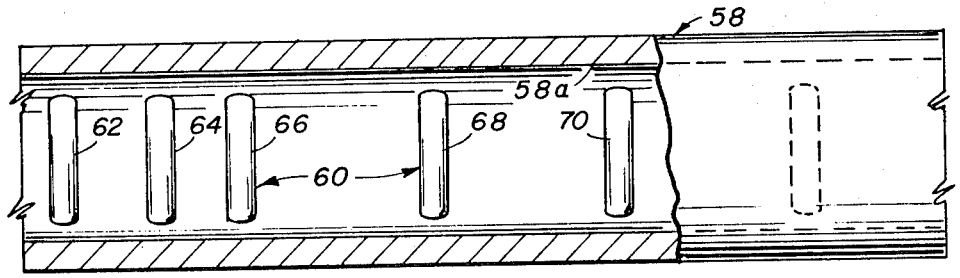
FIG. 4 is a cross sectional view of a portion of a tubular member constructed in accordance with the present invention, illustrated embodying ribbing in the form of a rib design that is provided on only one longitudinally extending side wall of the tubular member and wherein the ribs are discontinuous and uniform spacing exists between some of the ribs and variable spacing exists between others of the ribs.

Continuing now on to a discussion of FIG. 4 of the drawing, there is illustrated therein a tube 58 having ribbing, generally designated therein by reference numeral 60, provided on the inner surface 58a of the former. The ribs 62, 64, 66, 68 and 70 that comprise the ribbing 60 are all suitably located on only one longitudinally extending side wall of the tube 58. Moreover, the ribs 62, 64, 66, 68 and 70 are each discontinuous and the spacing therebetween may be either uniform as in the case of ribs 62, 64 and 66, or ribs 66, 68 and 70, or the spacing therebetween may vary as that existing between ribs 64 and 66, and ribs 66 and 68. The function of FIG. 4 is intended to be that of providing a teaching of a tube 58 which has ribbing 60 located on only one side wall thereof, and a teaching of such a ribbing 60 wherein the ribs 62, 64, 66, 68 and 70 are discontinuous and the spacing therebetween may be either uniform or variable.

FIG. 5 is similar to FIG. 4 in that there is depicted therein a portion of a tube 72, which embodies on the inner surface 72a thereof ribbing, generally designated by reference numeral 74 and wherein the ribbing 74 is located on only one longitudinally extending side wall of the tube 72. Like the ribs 62, 64, 66, 68 and 70, which comprise the ribbing 60 that is depicted in FIG. 4, the ribs 76, 78, 80, 82 and 84, which comprise the ribbing 74 shown in FIG. 5, are all discontinuous. However, the notable difference therebetween is that the pitch of the ribs 76, 78, 80, 82 and 84 may be either uniform as in the case of the ribs 76 and 78 or the ribs 82 and 84, or the pitch thereof may be variable as in the case of the ribs 76 and 84. FIG. 5 has been included in the drawing of the instant application for purposes of providing a teaching of a tube 72 that embodies ribbing 74 which is located on only one longitudinally extending side wall thereof, and wherein the ribs 76, 78, 80, 82 and 84 are discontinuous and may be of either uniform or variable pitch.

FIG. 6 contains a teaching of a tube 86 that embodies a construction, which is similar to that of the tubes 58 and 72 of FIGS. 4 and 5, respectively. Namely, the tube 86 embodies on the inner surface 86a thereof ribbing, generally designated by reference numeral 88, that is positioned entirely on only one longitudinally extending side wall of the tube 86. However, unlike the ribbing 60 and the ribbing 74 with which the tube 58 and the tube 72, respectively, are provided, the ribbing 88 with which the tube 86 is provided is continuous. Moreover, like the ribbing 74 of the tube 72, the ribbing 88 of the tube 86 may be of either uniform or variable pitch. Thus, FIG. 6 is intended to provide a teaching of a tube 86 embodying continuous ribbing 88 that is located on only one longitudinally extending side wall of the tube 86, and ribbing 88 which may be of either uniform or variable pitch.

FIGS. 7A–7G each depict a differently shaped rib. Moreover, the shape, which the individual ribs of a given ribbing that is intended for employment in a particular tubular member embody, may be selected from the various rib shapes that are to be found depicted in FIGS. 7A–7G. More specifically, considering each of FIGS. 7A–7G in turn, FIG. 7A illustrates a rib cross section, designated by reference numeral 90, wherein the heighth and the width of the rib are substantially equal, such that in cross section, the rib 90 embodies a substantially rectangular configuration. In FIG. 7B, there is illustrated a rib cross section, designated by numeral 92, wherein the heighth of the rib is somewhat greater than the width thereof, and wherein a radius is provided at each side of the base of the rib as well as at the top of the rib, whereby the rib 92 in cross section embodies a rounded shape, which in appearance bears somewhat of a resemblance to a portion of a sinusoidal wave form. FIG. 7C shows a rib cross section, designated by the numeral 94, wherein the width of the rib is somewhat greater than the heighth thereof, and wherein a radius is formed on each side of the base of the rib as well as at the top of the rib, whereby the rib 94, in cross section, embodies the appearance of a somewhat flattened version of the rib 92 of FIG. 7B. In FIG. 7D, there is depicted a rib cross section, designated by the numeral 96, wherein the heighth and the width of the rib are substantially equal, but the sides of the rib are inclined such that the overall appearance of the rib 96 in cross section is substantially that of an equilateral triangle. FIG. 7E is directed to a showing of a rib cross section, designated by the numeral 98, wherein the width of the rib is substantially greater than the heighth thereof, and at least one of the sides of the rib, i.e., that facing the direction of fluid flow, is inclined such that the appearance of the rib 98 in cross section is substantially that of a right triangle. In FIG. 7F there is to be found illustrated a rib cross section, designated by the numeral 100, wherein the heighth thereof is somewhat less than the width thereof, and wherein a radius is provided both at one side of the base thereof and at the top of the rib, and wherein one side of the rib is sloped, i.e., that facing the direction of fluid flow, whereby the rib 100 in cross section embodies an appearance somewhat like that of a ski slope. FIG. 7G is directed to a rib cross section, designated by the numeral 102, which is similar to the rib 100 of FIG. 7F in that the rib 102 has a width which is somewhat greater than the heighth thereof, and has a radius formed both at one side of the base thereof and at the top of the rib, and wherein the side of the rib 102 located in the path of fluid flow is inclined, i.e., sloped such that the latter face of the rib 102 is less pronounced in inclination than the inclined face of the rib 100.

There is, thus, provided in accord with the present invention a new and improved form of tubular member of the type intended to have fluid flow therethrough. Moreover, the tubular member of the present invention embodies means operable for exercising control over the movement of the fluid in the tubular member. In addition, in accord with the present invention, a tubular member is provided wherein control over the movement of the fluid therewithin is effected by providing the inner surface of the tubular member with ribbing, the latter embodying a variable configuration, the parameters of which are selected on the basis of the ability thereof to fulfill predetermined design criteria, i.e., the design criteria that will enable the tubular member to possess the fluid flow properties for each increment of length thereof required to achieve a maximization of the heat transfer rate to the fluid. Furthermore, the tubular member of the present invention embodies on the inner surface thereof variable ribbing wherein one of the parameters that determines the nature of the design of the ribbing and which is a variable is the angle which the ribs of the ribbing bear to the lateral axis of the tubular member, i.e., the pitch of the ribbing. Additionally, in accordance with the present invention, a tubular member is provided which embodies on the inner surface thereof variable ribbing wherein one of the parameters that determines the nature of the design of the ribbing and which is a variable is the spacing that exists between the individual ribs that collectively serve to comprise the ribbing. Also, the tubular member of the present invention embodies on the inner surface thereof variable ribbing wherein one of the parameters that determines the nature of the design of the ribbing and which is a variable is whether the ribbing is continuous or discontinuous. Furthermore, in accord with the present invention, a tubular member is provided which embodies on the inner surface thereof variable ribbing wherein one of the parameters that determines the nature of the design of the ribbing and which is a variable is whether the ribbing is provided on only one longitudinally extending side wall of the tubular member, or on more than one side wall thereof. Finally, the tubular member of the present invention embodies on the inner surface thereof variable ribbing wherein one of the parameters that determines the nature of the design of the ribbing and which is a variable is the shape of the individual ribs in terms of the heighth, width, radii and angles thereof.

While several embodiments of my invention have been shown, it will be appreciated that modifications thereof, some of which have been alluded to hereinbefore, may still be readily made thereto by those skilled in the art. I, therefore, intend by the appended claims, to cover the modifications alluded to herein as well as all other modifications, which fall within the true spirit and scope of my invention.

What is claimed is:

1. A boiler tube for effecting the heating by means of high temperature gaseous products of combustion flowing in surrounding relation thereto of a fluid flowing therethrough comprising a metallic cylinder having a hollow interior defining a passage for the fluid to flow through, means provided on the inner wall surfaces of said metallic cylinder for preventing the occurrence of nucleate boiling of the fluid flowing through the hollow interior of said metallic cylinder, said means comprising ribbing consisting of a multiplicity of individual ribs that are arranged in a preselected variably configured pattern so as to inbue each increment of length of said metallic cylinder with the proper fluid flow properties required for purposes of achieving a maximization without causing nucleate boiling of the rate of heat transfer through the walls of said metallic cylinder to the fluid flowing through the hollow interior of said metallic cylinder, the arrangement of said multiplicity of individual ribs in said preselected variably configured pattern being determined in accordance with parameters selected from amongst a plurality of variable factors to fulfill certain preestablished design criteria having for their objective the prevention of nucleate boiling.

2. The boiler tube as set forth in claim 1 wherein one of said plurality of variable factors comprises the angles said multiplicity of individual ribs bear to the lateral axis of said metallic cylinder, said angles defining the pitch of each of said multiplicity of individual ribs.

3. The boiler tube as set forth in claim 1 wherein one of said plurality of variable factors comprises the spacing existing between each adjacent pair of said multiplicity of individual ribs.

4. The boiler tube as set forth in claim 1 wherein one of said plurality of variable factors comprises the length embodied by each of said multiplicity of individual ribs.

5. The boiler tube as set forth in claim 1 wherein one of said plurality of variable factors comprises the position occupied by said multiplicity of individual ribs on the inner wall surfaces of said metallic cylinder.

6. The boiler tube as set forth in claim 1 wherein one of said plurality of variable factors comprises the height embodied by each of said multiplicity of individual ribs.

7. The boiler tube as set forth in claim 1 wherein one of said plurality of variable factors comprises the width embodied by each of said multiplicity of individual ribs.

8. The boiler tube as set forth in claim 1 wherein one of said plurality of variable factors comprises the radii of curvature embodied by each of said multiplicity of individual ribs.

9. The boiler tube as set forth in claim 1 wherein one of said plurality of variable factors comprises the angles formed by the side walls embodied in each of said multiplicity of individual ribs.

* * * * *